United States Patent
Tucker

(10) Patent No.: US 9,385,420 B2
(45) Date of Patent: Jul. 5, 2016

(54) WIRELESS ANTENNA FOR RFID TIRES

(75) Inventor: Randall L. Tucker, Findlay, OH (US)

(73) Assignee: Cooper Tire & Rubber Company, Findlay, OH (US)

( * ) Notice: Subject to any disclaimer, the term of this patent is extended or adjusted under 35 U.S.C. 154(b) by 1078 days.

(21) Appl. No.: 12/930,334

(22) Filed: Jan. 4, 2011

(65) Prior Publication Data

US 2011/0198402 A1     Aug. 18, 2011

Related U.S. Application Data

(63) Continuation-in-part of application No. 12/806,726, filed on Aug. 18, 2010.

(60) Provisional application No. 61/337,933, filed on Feb. 12, 2010.

(51) Int. Cl.
| | |
|---|---|
| *G06K 19/06* | (2006.01) |
| *H01Q 1/32* | (2006.01) |
| *B60C 23/04* | (2006.01) |
| *G06K 19/02* | (2006.01) |
| *G06K 19/04* | (2006.01) |
| *G06K 19/077* | (2006.01) |
| *H01Q 1/22* | (2006.01) |
| *H01Q 7/00* | (2006.01) |

(52) U.S. Cl.
CPC .......... *H01Q 1/3233* (2013.01); *B60C 23/0452* (2013.01); *B60C 23/0493* (2013.01); *G06K 19/02* (2013.01); *G06K 19/041* (2013.01); *G06K 19/07749* (2013.01); *G06K 19/07764* (2013.01); *H01Q 1/2241* (2013.01); *H01Q 7/00* (2013.01); *Y10T 29/49002* (2015.01)

(58) Field of Classification Search
USPC ........................................ 235/492; 29/592.1
See application file for complete search history.

(56) References Cited

U.S. PATENT DOCUMENTS

| | | | |
|---|---|---|---|
| 4,246,217 A * | 1/1981 | Hottel et al. ................. 264/105 |
| 5,330,527 A * | 7/1994 | Montecalvo et al. ......... 607/152 |
| 5,562,787 A | 10/1996 | Koch et al. |
| 5,741,966 A | 4/1998 | Handfield et al. |
| 6,062,072 A | 5/2000 | Mock et al. |
| 6,147,659 A | 11/2000 | Takahashi et al. |
| 6,807,853 B2 | 10/2004 | Adamson et al. |
| 6,856,245 B2 | 2/2005 | Smith et al. |
| 6,897,770 B2 | 5/2005 | Lill |
| 7,009,576 B2 | 3/2006 | Adamson et al. |
| 7,186,308 B2 | 3/2007 | Metcalf et al. |
| 7,504,947 B2 | 3/2009 | Tucker |

(Continued)

OTHER PUBLICATIONS

International Search Report for PCT/US2011/00065; Date of Mailing May 6, 2011.

(Continued)

*Primary Examiner* — Rafferty Kelly
(74) *Attorney, Agent, or Firm* — Emch, Schaffer, Schaub & Porcello Co. L.P.A.

(57) ABSTRACT

An RFID device for tires utilizes a wireless antenna. The antenna is formed of a pair of spaced apart electrically conductive rubber units. The conductive rubber antenna is encapsulated between a pair of non-conductive sheets. A third non-conductive member encircles the conductive rubber antenna and is itself sealed between the first and second sheets of non-conductive material. A microchip is positioned in the slot defined by the space between the units and conductively attached to each of the units.

19 Claims, 5 Drawing Sheets

(56) References Cited

U.S. PATENT DOCUMENTS

| | | | |
|---|---|---|---|
| 2004/0159383 A1* | 8/2004 | Adamson et al. | 152/152.1 |
| 2004/0252072 A1 | 12/2004 | Adamson et al. | |
| 2005/0093761 A1 | 5/2005 | King et al. | |
| 2007/0007661 A1 | 1/2007 | Burgess et al. | |
| 2007/0279202 A1* | 12/2007 | Lionetti | 340/447 |
| 2008/0119957 A1* | 5/2008 | Ellis et al. | 700/224 |
| 2010/0032066 A1* | 2/2010 | Nakao et al. | 152/152.1 |

OTHER PUBLICATIONS

International Search Report for PCT/US2010/02284; Date of Mailing Oct. 12, 2010.

* cited by examiner

WIRELESS ANTENNA FOR RFID TIRES

CROSS REFERENCE TO RELATED APPLICATIONS

This application is based upon and claims the benefit of U.S. Provisional Patent Application No. 61/337,933 filed Feb. 12, 2010 and is a continuation in part of U.S. patent application Ser. No. 12/806,726 filed Aug. 18, 2010.

BACKGROUND OF THE INVENTION

The use of radio frequency identification devices (RFID) in tires is gaining in popularity. See for example my issued U.S. Pat. No. 7,504,947. Other devices, including RFID devices, which may be incorporated on a surface of or within the structure of a tire for monitoring various functions relative to the tire include the following U.S. Pat. Nos. 5,562,787; 5,741,966; 6,062,072; 6,856,245; 6,897,770; 7,009,576; and 7,186,308. The disclosures contained in these patents are incorporated herein by reference.

U.S. Pat. No. 7,009,576 discloses a tire having a radio frequency antenna embedded therein. Since the rubber in which the radio frequency antenna is embedded is in a mixture of rubber and the conductive dielectric material carbon black, the patent discloses the use of an insulating layer, which is attached to the antenna by an adhesive coating, to insulate the antenna from the conductive dielectric rubber. Although U.S. Pat. No. 7,009,576 does not specifically identify the material from which the antenna is manufactured, typically, the antenna will be a conductive metal wire or a thin sheet of metal foil such as copper as disclosed in U.S. Pat. No. 5,562,787 or 6,147,659.

RFID devices for use in tires continues to be a goal in order to provide improved quality and traceability. However, the tire industry has been slow to adopt the RFID devices with their copper antennas. The installation foreign material in a tire is a concern. The ability to provide RFID devices in a tire with minimal component size is an important goal.

SUMMARY OF THE PRESENT INVENTION

The RFID device of the present invention utilizes a wireless antenna of conductive rubber along with a computer chip and is embedded in the body of a tire or affixed to the inner surface of the tire. The antenna is formed of electrically conductive green rubber encapsulated in insulation formed by a pair of non-conducting green rubber sheets adhered together. The insulation preferably is a non-conducting green rubber but could be non-conducting rubber or other materials having properties suitable for integration within the rubber tire. Other materials which may be utilized for the insulation include an elastomer or rubber minus the carbon black which is the conductive component. The insulation isolates the antenna from the dielectric rubber of the tire and, thereby, prevents the conductive rubber from dissipating the energy being conducted by the antenna.

The RFID device of the present invention utilizes a standard computer chip, preferably an EPC1 GEN2 RFID chip of less than one millimeter (1 mm)×one millimeter in size. The RFID chip is coupled with a conductive rubber dipole or slot antenna. Under one embodiment, conductive adhesives and/or other encapsulates maybe utilized to improve the interface between the chip mounting and the rubber antenna thus improving the performance. In this case, cured or vulcanized rubber rather than green rubber could be used for the antenna. If green rubber is used for the antenna, it is not necessary to use adhesive as the natural stickiness of the green rubber will cause it to adhere to the surface of the insulating layer engaged thereto. On the other hand, it is possible to use adhesive with an antenna of green rubber in order to provide a more effective seal. The sub-assembly of the rubber antenna and the computer chip is enclosed in a non-conductive rubber envelope or sheets. The current technology allows for the rubber antenna to be an integral component of the tire with no concerns of destroying the integrity of the tire.

Preferably the RFID device of the present invention is produced in the uncured state. It is affixed to the inner or outer surface of the tire in the green state. It may also be embedded in the tires, between the plies. Following such affixing or embedding, it is vulcanized along with the rest of the tire. However, it could also be vulcanized and then affixed following vulcanization of the tire or assembled using vulcanized conductive rubber and then affixed to the tire. The installed RFID devices will allow improved quality, sorting of tires on conveyors and tracking of shipments.

The prior art RFID devices for tires utilize a wire wound antenna. The wire wound antenna comes into direct contact with the rubber. The carbon black used in the tire rubber causes the rubber to be somewhat conductive. Unless properly insulated, the conductive characteristics of the tire rubber will de-tune the antenna of the RFID device which greatly reduces its effective range.

The antenna of the RFID device of the present invention has a conductive rubber compound which has been developed for its conductivity to get into the range of 20 ohms to 400 ohms per inch of rubber. Resistances in the range of 40-100 ohms per inch are suitable for use as an antenna. The non-conductive rubber is utilized as an electrical insulator which isolates the antenna from the rubber of the tire. The encapsulation in the non-conductive rubber causes the antenna to stay in tune with the RFID microchip, which allows for the long range read characteristics.

IN THE DRAWINGS

DETAILED DESCRIPTION OF THE INVENTION

Figure 1:
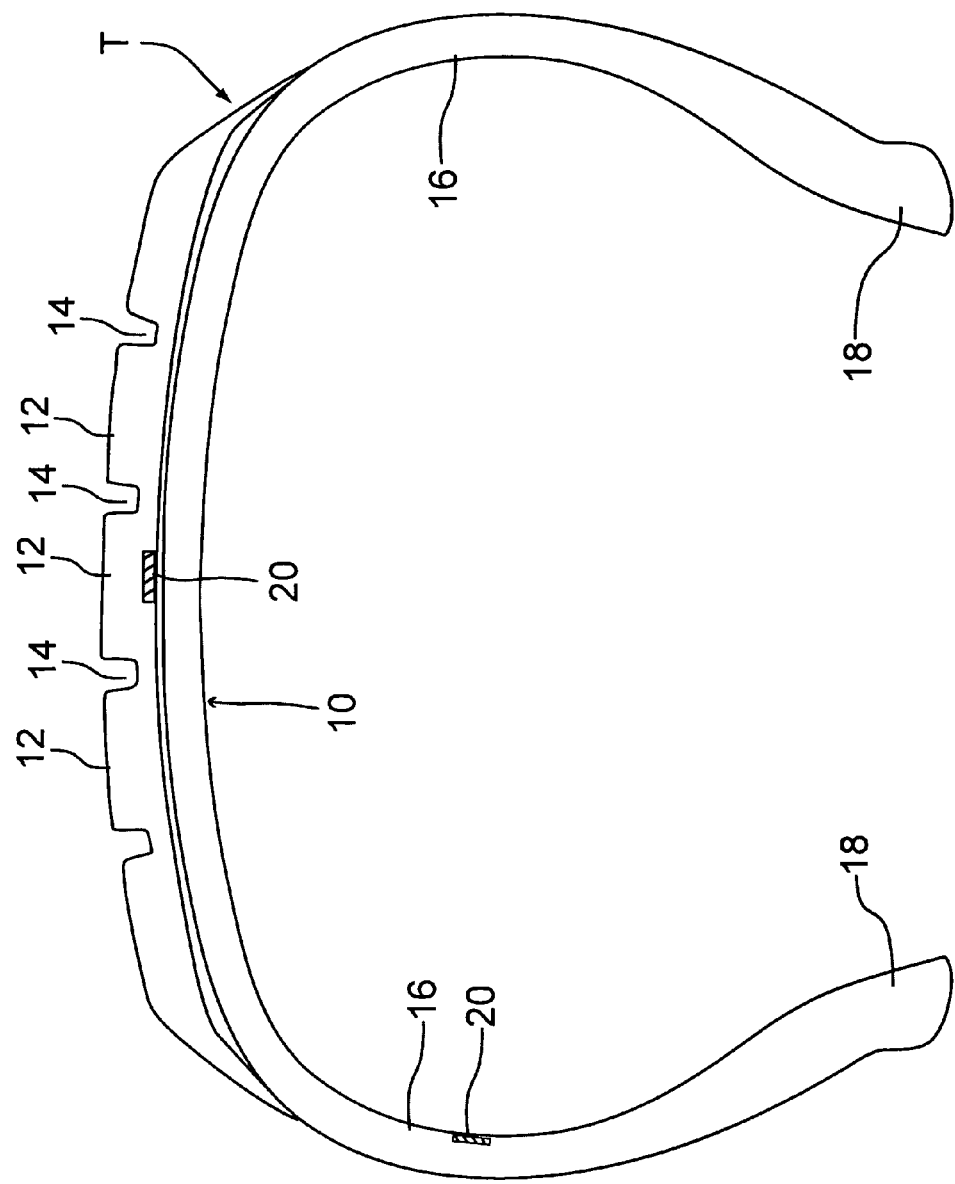
FIG. 1 is a sectional view of a tire showing an RFID device with the antenna of the present invention encapsulated therein or affixed to the interior sidewall.

Referring to FIG. 1 there is shown a tire T having a crown 10 with external treads 12 and grooves 14. In cross-section the tire T has the crown 10 extending radially outwardly along an arcuate path to a pair of oppositely disposed sidewalls 16 which define the maximum radial extent of the tire T. The sidewalls 16 curve inwardly from such maximum radial extent to a narrower area terminating at a pair of oppositely disposed beads 18. As shown in FIG. 1 there is provided an RFID device 20 of the present invention which is permanently embedded either in the crown 10 or in one of the sidewalls 16. It may also be adhered to the inner surface of the tire in the area of the crown 10 or the sidewall 16.

Figure 2:
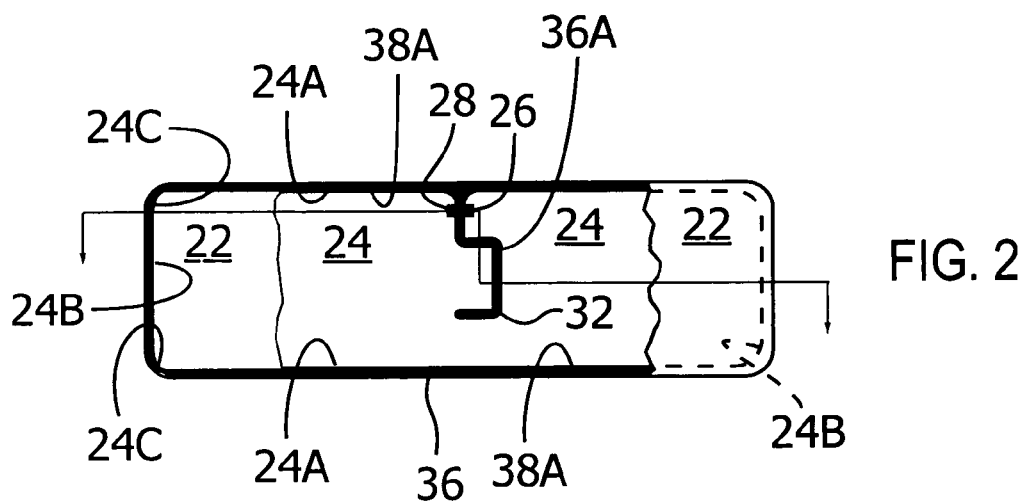
FIG. 2 is a plan view showing one form of RFID device with a microchip and antenna encapsulated in and between layers of insulation material.
Figure 3:
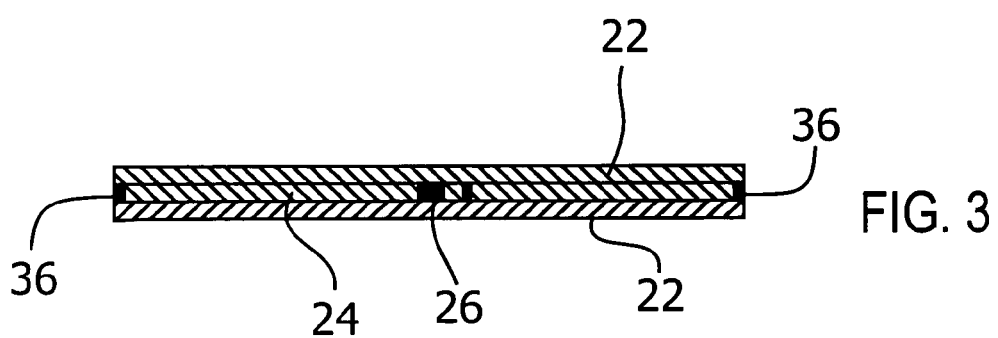
FIG. 3 is a sectional view along line 3-3 of FIG. 2.
Figure 4:
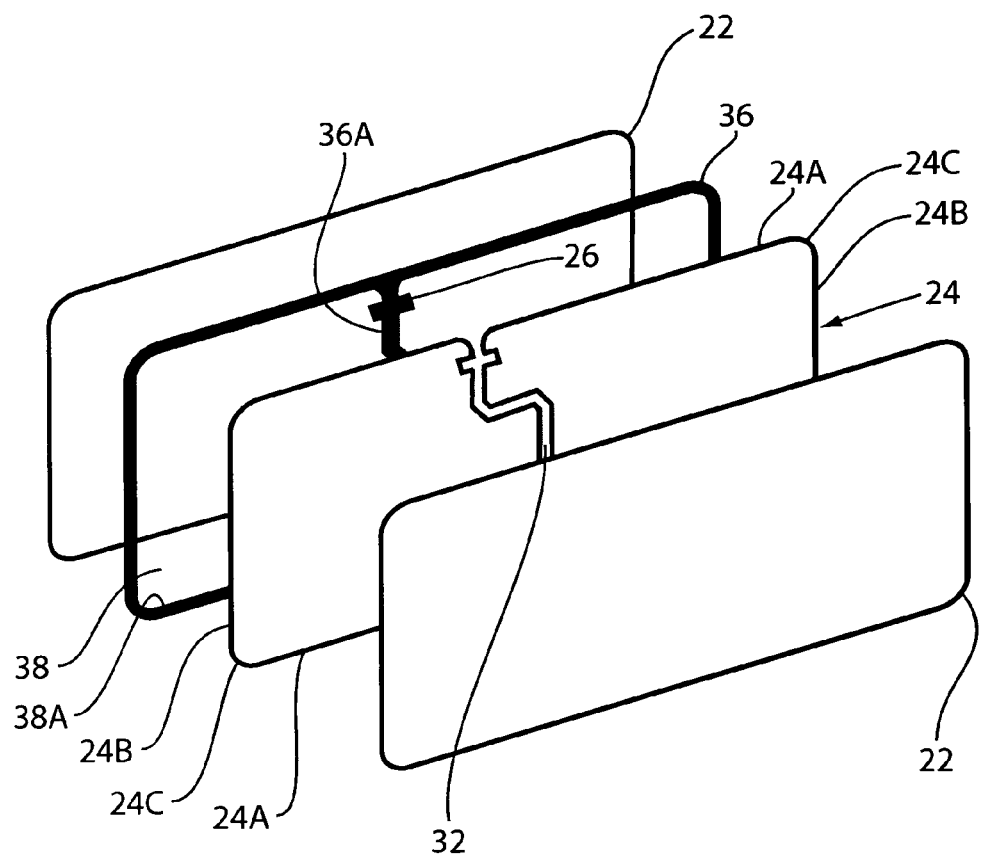
FIG. 4 is an exploded perspective view of the RFID device of the present invention utilizing the wireless antenna of the present invention.

Referring to FIGS. 2, 3 and 4, the RFID device includes a pair of insulation members 22 and an antenna 24 encapsulated therebetween. A RFID microchip 26 such as EPC1 GEN has tabs 28 attached to the antenna 24. The antenna 24, which may be one of a number of shapes, is shown as a rectangle having a length defined by long upper and lower (as viewed in FIGS. 2 and 4) edges 24A, short side edges 24B and curved or arcuate corners 24C.

The antenna 24 has a slot 32 extending downwardly (as viewed in FIGS. 2 and 4) from the upper edge 24A which follows a path which provides suitable tuning characteristics for the specific RFID microchip 26 utilized.

The slot 32 as shown in FIG. 2 follows a downward path toward the lower edge 24A followed by one curving into a perpendicular segment extending toward the side edge 24B on the right followed by another segment extending toward the lower edge 24A and finally one extending toward the side edge 24B on the left. The slot 32 could also have segments disposed at acute angles to the edges 24A and 24B as well as curved segments depending on the shape most suitable for tuning for the specific RFID microchip utilized. Depending upon the characteristics of the microchip, it could also be straight and could extend completely between the upper edge 24A and the lower edge 24A thereby resulting in the antenna 24 being two pieces separated by the slot 32.

As may be seen most clearly in FIGS. 2 and 4, a stamped or otherwise shaped central insulation member 36 formed of non-conductive green rubber is also positioned between the two insulation members 22. The stamped insulation member 36 has an enlarged opening 38 sized to snugly receive therein the antenna 24. Thus, the internal edge 38A of the opening 38 is substantially the same size as the peripheral edge of the antenna 24 as represented by the numerals 24A, 24B, and 24C. With this construction, the antenna 24, including its edges is completely encapsulated in non-conducting insulation members 22, 36 and 22.

The stamped insulation member 36 has an internal extension 36A sized and shaped to fit in the slot 32. The internal extension 36A substantially fills the slot 32. If the slot 32 was not filled with the insulation of the internal extension 36A, the green rubber of the antenna 24 would flow into the slot 32 during vulcanization of the tire or during vacanization of the RFID device 20 if done prior to its assembly in the tire T.

As previously discussed, the length and shape of the slot 32 are designed to tune the antenna to be at substantially the same frequency of the RFID microchip 26.

In preparation for assembly of the insulation members 22, the antenna 24 and the stamped insulation member 36, the RFID microchip 26 may be mounted on either the stamped insulation member 36 (as shown in FIG. 4) or on the antenna 24. In either event, the tabs 28 of the microchip must be engaged to the antenna 24 on opposite sides of the slot 32 when the components are assembled to form the RFID device 20. The location of the chip may be adjusted to improve performance of the RFID device 20.

The insulation members 22 may be formed of any of a number of non-conductive or low conductive materials such as those specified above and having a dielectric constant of about 4 or less. The insulation members 22 have a thickness in the range of 0.05 mm to 3 mm, where mm is millimeters. The thickness of the antenna 24 and the central insulation member 36 are also in the range of 0.05 mm to 3 mm. Although the central insulation member 36 and the antenna 24 should be the same thickness, it is not necessary that they be the same thickness as the other insulation members 22, 22. They could be thinner or thicker than such other insulation members 22, 22. Additionally, it is possible that one on the outer insulation members 22 be thicker than the other outer insulation member 22.

The amount of carbon black and/or other ingredients providing conductivity to the antenna 24 is such as to give it a resistance in the range of 20 ohms to 400 ohms and preferably in the range of 40 ohms to 100 ohms.

As can be seen in FIG. 3, the opposing insulation members 22, 22 are sealed to the central insulation member 36 completely around the periphery to thereby encapsulate the antenna 24 and the RFID chip 26. As previously discussed, the internal edge 38A of the enlarged opening 38 seals the edges 24A, 24B and 24C of the antenna 24. Preferably, the insulation members 22, 22 and 36 are formed non-conductive green (non-vulcanized) rubber. When manufactured of green rubber, the edges of the opposed insulation members 22 will adhere to the central insulation member 36 without the necessity of providing any adhesive therebetween. The insulation members 22, 36, 22 will also adhere to the antenna 24 without the use of adhesive provided all of such members are green rubber. When green rubber is used for the insulation and the antenna 24, the insulation members 22, 22 and the central insulation member 36 can be sealed together and to the antenna 24 simply by pressing together. If the insulation members 22 and/or central insulation member 36 and/or antenna 24 are formed of a material other than green rubber, they can be heat sealed or adhesively joined together.

The completed assembly of the insulation members 22, 22 central insulation member 36, antenna 24 and RFID microchip 26 forming the RFID device 20 may be positioned in the tire T between the various plies thereof or on its inner surface as previously discussed. Following positioning in the tire T or in its inner surface, it will be included in the vulcanization of the tire thereby providing a completed tire and RFID device with a wireless antenna.

If desired, the RFID device of the present invention could be packaged while the insulation layers 22, 22 and 36 and the antenna 24 layer are in the green state and then shipped another manufacturing facility for installation in tires during manufacturing. Additionally, the RFID device of the present invention could itself be vulcanized prior to incorporation in a tire.

Figure 5:
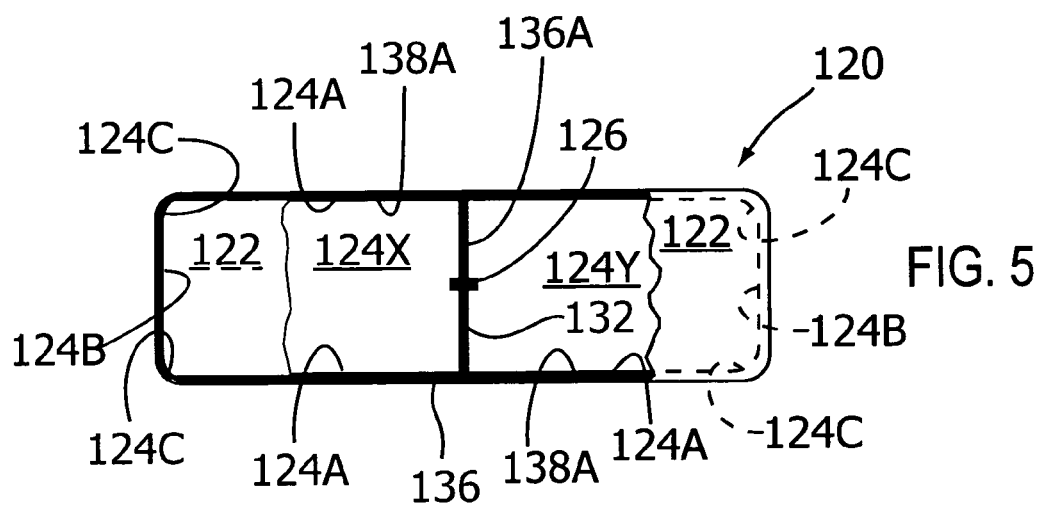
FIG. 5 is a view similar to FIG. 2 showing a different embodiment.
Figure 6:
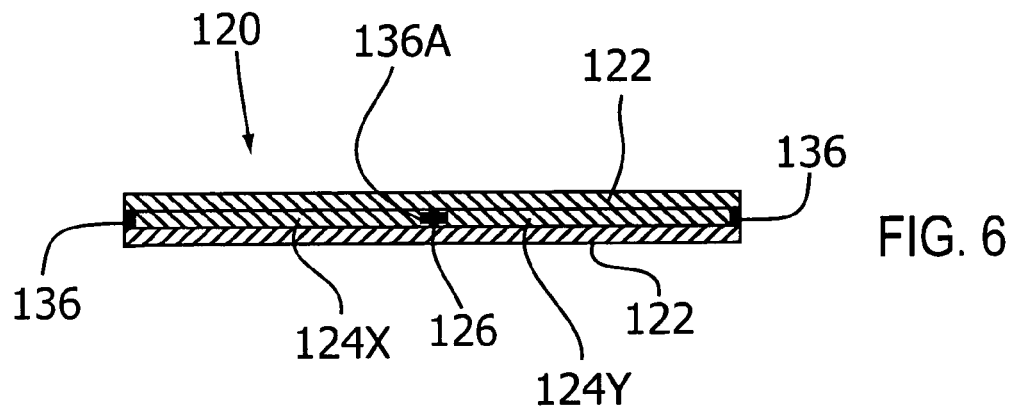
FIG. 6 is a view similar to FIG. 3 of the embodiment of FIG. 5.
Figure 7:
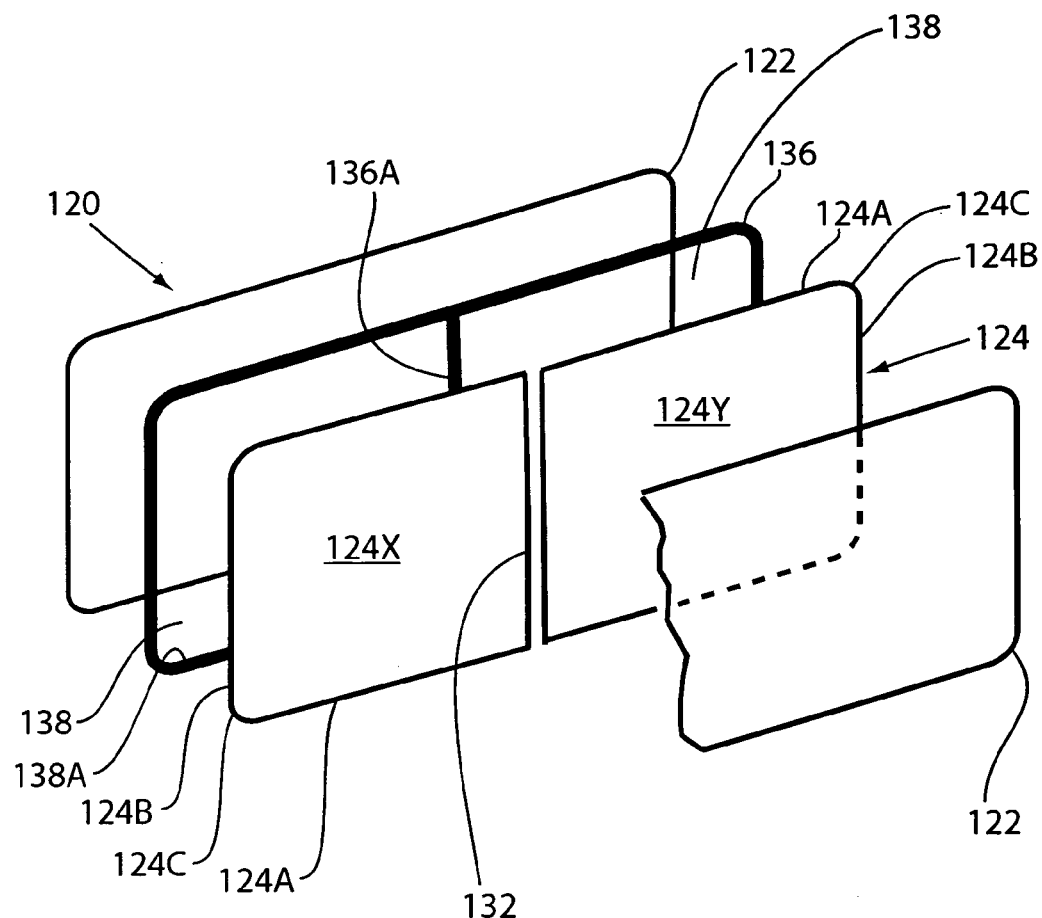
FIG. 7 is an exploded perspective view of the embodiment of FIG. 5.

Referring to FIGS. 5-7 there is shown a modified embodiment of RFID device incorporating a modified antenna. The modified RFID device 120 utilizes non-conductive insulation members 122 similar to the insulation members 22 of the embodiment of FIGS. 1-4. However, under the present embodiment there is provided an antenna member 124 comprised of two separate units, 124X and 124Y. The antenna units 124X and 124Y are formed of electrically conductive green rubber when inserted in the interior plies of a being assembled tire and then vulcanized. For those RFID devices intended to be adhered to the interior surface of a completed tire, the electrically conducting rubber for the antenna would not be green rubber. Preferably the antenna units 124X and 124Y are the same size and when assembled as shown in FIGS. 5 and 6 are spaced apart to provide therebetween a slot 132 which follows a straight line path separating antenna unit 124X from antenna unit 124Y. The width of the slot 132 which defines the space between such antenna unit 124X and 124Y is preferably in the range of 1.6 to 3.2 millimeters (mm).

Each of the antenna units 124X and 124Y has a pair of upper and lower edges 124A and ends 124B joined by arcuate corner edges 124C.

A central insulation member 136 has a pair of enlarged openings 138, which openings are separated by a slot filling member 136A. The central insulation member 136 is sized such that the openings 138 each snuggly receive therein one of the antenna units 124X or 124Y. When such antenna units, 124X and 124Y, are received in their respective openings 138, the insulation slot filling member 136A will be snugly received in the slot 132 separating the antenna units 124X and 124Y. As with the previous embodiment, a microchip 126 is positioned in the slot 132 and has leads on one side connected to antenna unit 124X and leads on the opposing side connected to antenna 124Y. Preferably the microchip 126 is mounted on the insulation slot filling member 136A. The position of the microchip 126 may be adjusted to be closer or further from the upper edges 124A; however, it is preferably midway between the upper and lower edges 124A.

The insulation members 122 are adhered to opposing sides of the assembled central insulation member 136, antenna unit 124X and 124Y, and the microchip 126.

Tuning of the antenna member 124 may be accomplished by varying the size of the antenna units 124X and 124Y. it is preferable that the antenna units are the same size; however, it is within the contemplation of the present invention that one of such antenna units could be larger than the other of such antenna units 124X, 124Y.

A major advantage of the embodiment of FIGS. 5-7 is that it can be read from a much greater distance than the RFID device 20 of the embodiment of FIGS. 1-4. Thus, the modified RFID device 120 of FIGS. 5-7 can be read from a distance of 12 feet as opposed as to only a distance of 3 feet for some configurations of slots 32 shown and as described in the embodiment of FIGS. 1-4.

The RFID device of the present invention is one which is economical to manufacture, can be readily incorporated in a tire and can be monitored from a distance as great as 12 feet and possibly greater.

Many modifications will be readily apparent to those skilled in the art. Accordingly, the scope of the present invention should be determined by the scope of the claims appended hereto.

The invention claimed is:

1. An RFID device comprising:
   (a) a first sheet of non-conductive material having an outwardly facing peripheral edge;
   (b) an antenna member having a first antenna unit of conductive rubber sheet engaged to said first sheet and a second antenna unit of conductive rubber sheet engaged to said first sheet in spaced relationship with said first antenna member, the space between said first antenna unit and said second antenna unit defining a slot, said first antenna unit having an upper edge, a lower edge and an end edge, each of said edges spaced from the peripheral edge of said first sheet and said second antenna unit having an upper edge, a lower edge and an end edge, each of said edges being spaced from the peripheral edge of said first sheet;
   (c) a microchip positioned in said slot and conductively engaged to said first antenna unit and to said second antenna unit;
   (d) a non-conductive member encircling said antenna member and engaging the outwardly facing upper, lower and end edges of each said antenna unit, said non-conductive member having an internal extension positioned in said slot; and
   (e) a second sheet of non-conductive material engaged to (i) said antenna and (ii) said encircling non-conductive member;
   said first and second sheets co-operating with said non-conductive member to encapsulate said antenna and said microchip.

2. The RFID device according to claim 1 wherein said antenna has an electrical resistance in the range of 20 ohms to 400 ohms.

3. The RFID device according to claim 1 wherein said antenna has a electrical resistance in the range of 40 ohms to 100 ohms.

4. The RFID device according to claim 1 wherein each of said antenna and said encircling non-conductive member has a thickness in the range of 0.05 mm to 3 mm.

5. The RFID device according to claim 1 wherein said first and second sheets are adhered to said antenna by said antenna or said first and second sheets being green rubber.

6. The RFID device according to claim 1, where said first antenna unit is substantially the same size as said second antenna unit.

7. The RFID device according to claim 1 wherein said microchip is positioned substantially midway between said upper edge and said lower edge.

8. A tire having implanted therein or fastened on a surface thereof the RFID device of claim 1.

9. A method for forming an RFID device comprising the steps of:
   (a) providing a pair of electrically conductive rubber sheet units each having an upper edge, a lower edge and an end edge;
   (b) positioning said electrically conductive rubber sheet units in side-by-side spaced-apart relationship defining a slot therebetween;
   (c) encircling said upper edges; lower edges and end edges with non-conductive material;
   (d) positioning a microchip in a portion of said slot and non-conductive material in other portions of said slot;
   (e) electronically connecting said microchip to each of said pair of electrically conductive sheet units; and
   (f) fastening non-conductive material to opposite sides of said pair of electrically conductive sheet units and to said encircling non-conductive material to thereby encapsulate said pair of electrically conductive sheet units.

10. The method according to claim 9 wherein said electrically conductive rubber is in the green state throughout steps (a) through (f) and further including the step of vulcanizing the assembly formed by steps (a) through (f).

11. The method according to claim 9 further including the step of positioning non-conductive material in those portions of said slot not occupied by said microchip.

12. The method according to claim 9 further including the step of tuning said antenna by varying the size of said electrically conductive sheet units.

13. The method according to claim 9 wherein said electrically conductive rubber is in the green state throughout steps (a) through (f) and further including the step of engaging said RFID device with said electrically conductive rubber in the green state to a partially manufactured tire having components of rubber in the green state and thereafter vulcanizing said tire and said RFID device.

14. A method for forming an RFID device comprising the steps of:
   (a) providing an antenna of electrically conductive robber having first and second sheet units; each of said units having an upper edge and a lower edge, and having a thickness in the range of 0.05 mm to 3 mm;
   (b) positioning said sheet units in spaced apart relationship, the space between said units defining a slot extending between said upper edges and said lower edges;

(c) encircling said sheet units with nonconductive material having the same thickness as said units;
(d) positioning a microchip in a portion of said slot;
(e) electrically connecting said microchip to each of said units on opposite sides of said slot; and
(f) fastening non-conductive material having a thickness in the range of 0.05 mm to 3 mm to opposite sides of said antenna and to said encircling non-conductive material to thereby encapsulate said antenna.

15. The method according to claim 14 wherein said electrically conductive rubber is in the green state throughout steps (a) through (f) and further including the step of vulcanizing the assembly formed by steps (a) through (f).

16. The method according to claim 14 further including the step of positioning non-conductive material in those portions of said not occupied by said microchip.

17. The method according to claim 14 wherein said antenna has an electrical resistance in the range of 20 ohms to 400 ohms.

18. The method according to claim 14 further including the step of tuning said antenna by varying the size of said units.

19. The method according to claim 14 wherein said electrically conductive rubber is in the green state throughout steps (a) through (f) and further including the step of engaging said RFID device with the electrically conductive rubber of said antenna being in the green state to a partially manufactured tire having components of rubber in the green state and thereafter vulcanizing said tire and said RFID device.

\* \* \* \* \*